Figure 1:
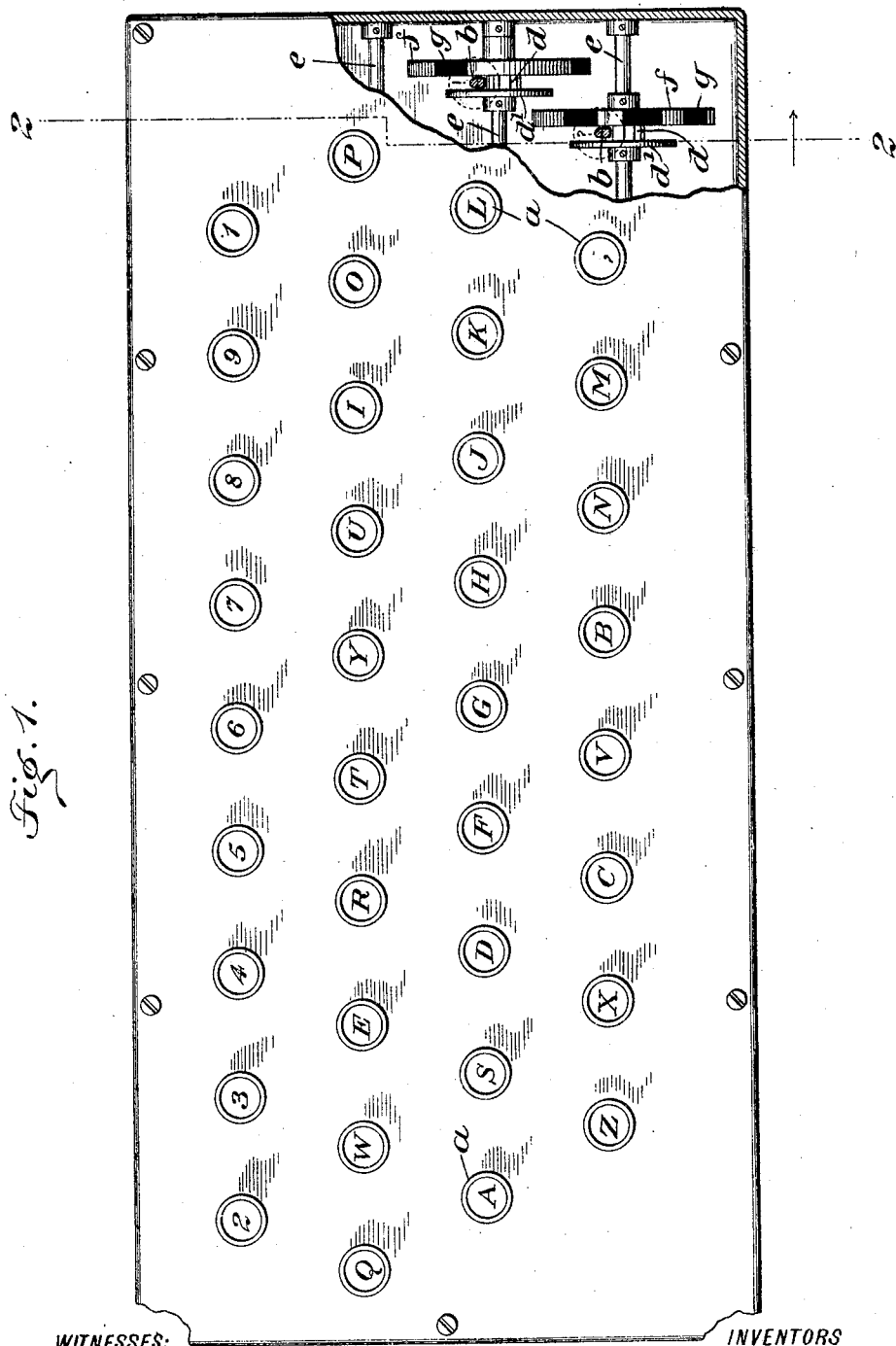

No. 799,392. PATENTED SEPT. 12, 1905.
W. H. LEONARD & J. H. LEWIS.
TELEGRAPH TRANSMITTER.
APPLICATION FILED DEC. 14, 1904.

2 SHEETS—SHEET 1.

WITNESSES:

INVENTORS
William H. Leonard
Joseph H. Lewis
BY
ATTORNEYS

No. 799,392. PATENTED SEPT. 12, 1905.
W. H. LEONARD & J. H. LEWIS.
TELEGRAPH TRANSMITTER.
APPLICATION FILED DEC. 14, 1904.
2 SHEETS—SHEET 2.
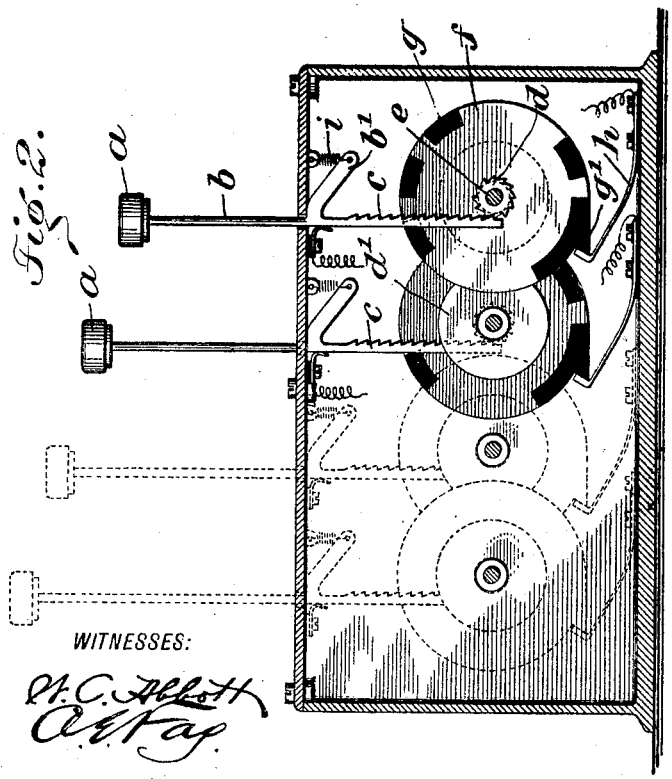
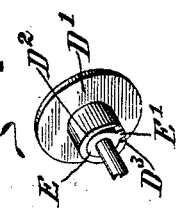
WITNESSES:
INVENTORS
William H. Leonard
Joseph H. Lewis
BY
ATTORNEYS

UNITED STATES PATENT OFFICE.

WILLIAM H. LEONARD, OF MOUNT VERNON, AND JOSEPH H. LEWIS, OF NEW YORK, N. Y.

TELEGRAPH-TRANSMITTER.

No. 799,392.     Specification of Letters Patent.     Patented Sept. 12, 1905.

Application filed December 14, 1904. Serial No. 236,885.

*To all whom it may concern:*

Be it known that we, WILLIAM H. LEONARD, a resident of Mount Vernon, in the county of Westchester, and JOSEPH H. LEWIS, a resident of the city of New York, borough of Manhattan, in the county of New York, State of New York, citizens of the United States, have invented a new and Improved Telegraph-Transmitter, of which the following is a full, clear, and exact description.

It has heretofore been proposed to provide means whereby the striking of a key will automatically transmit a character of the Morse alphabet upon a telegraph-line. The devices which have been constructed for this purpose are open to many objections, among which may be mentioned the fact that they have to be wound up before they will operate, that if the finger is kept too long upon a key it will transmit the same character repeatedly, and that they are expensive in construction, and therefore their use in practice is limited.

The principal objects of our invention are to provide a device of the character mentioned in which these disadvantages will be eliminated, the operation of the key itself being sufficient to transmit the character without the employment of any clockwork to be wound up, the depressing of the key once serving to transmit one character only and the construction being so simple that the cost will be very small and there will be very few parts to get out of order.

Reference is to be had to the accompanying drawings, forming a part of this specification, in which similar characters of reference indicate corresponding parts in all the figures.

Figure 1 is a plan view showing one form of our invention partly broken away to illustrate interior construction. Fig. 2 is a sectional view on the line 2 2 of Fig. 1, showing the positions of certain parts in dotted lines. Fig. 3 is a sectional view, on an enlarged scale, showing another modification which can readily be applied to the form shown in Fig. 2; and Fig. 4 is a perspective view of the same with parts removed.

Fig. 1 shows a universal keyboard; but it is to be understood that any other kind could be employed, if desired. Each key $a$ is mounted upon a reciprocating rod $b$, and on the lower end of this rod is a rack $c$, engaging with a toothed wheel $d$. This wheel is mounted upon a collar $d'$ on a shaft $e$, upon which is mounted a metallic disk $f$, the wheel and disk being rigid with respect to each other and the collar serving as a guide for the rack. Upon the periphery of the disk are a series of insulating-blocks $g$, preferably formed of hard rubber. These disks are provided with a projection $g'$ for engaging a resilient conductor or spring $h$. This spring and the bar $b$ are provided with electrical connections, so that when the disk is so located that the spring $h$ bears upon a metallic portion of the periphery of the disk $f$ a current will pass through the line; but when the spring is so located as to bear upon one of the insulating-blocks the current will be interrupted. The insulating-blocks on each disk are so arranged that the conducting-spaces on the periphery will represent a character of the Morse or any other alphabet in dots and dashes or the like.

Each bar $b$ is preferably provided with a projection $b'$, which is connected, by means of a spring $i$, with the casing of the device or any other stationary element. The purpose of the spring is to draw the bar back to normal position after the key has been depressed. There is nothing to interfere with this operation except the teeth of the wheel $d$, and the rod $b$ is mounted loosely enough to permit it to yield to pass the teeth.

The operation will be obvious. Upon the depression of the key the rack $c$ will be depressed so as to turn the disk through one complete revolution, the spring $h$ making contact through the disk at intervals and the contact being interrupted in such a manner as to produce the desired dots and dashes at the receiving instrument. When the disk has completed a revolution, the projection $g'$ will catch the spring $h$, and upon the release of the key the spring $i$ will draw the rack up without turning the disk backwardly or making it perform another revolution. The key is then ready for again performing its office.

It will be understood that each of the keys is connected in the same manner with a disk and that no two of the disks are connected together in any way except by being rotatably mounted upon the shafts $e$. It will also be seen that there is no danger of any of the difficulties such as those set forth above and that the device is very simple in construction and can be easily maintained.

Figs. 5 and 6 show a modification which can be applied in place of the rack $c$ and toothed wheel $d$. It will be noticed that the teeth of the rack $c$ all point downwardly. In these figures a rack C is provided with gear-teeth meshing with a pinion D upon a collar D', which is rotatably mounted upon a shaft $e$. A disk F is constructed in a similar manner to the disk $f$, but is fixed to the shaft $e$ by a pin F' instead of being rotatable upon it. The collar D' is rotatable upon the shaft $e$, and a hub E is also fixed on the shaft $e$ by a pin $E^2$ in a depression in the collar. This hub is provided with a tooth E', adapted to be guided by a cam-surface $D^2$ upon the collar D'. This cam-surface extends inwardly at one end and at the other end is provided with an abrupt shoulder $D^3$, against which the projection E' is adapted to abut. The collar D' is slidable upon the shaft $e$, and a spring G is employed to keep it normally in its outer position, so that the projection E' will rest in the bottom of the cam-surface $D^2$. When the rack C is depressed, it will turn the pinion D, and the projection E' being in engagement with the shoulder $D^3$ it will also turn the hub E and the shaft $e$, carrying with it the disk F. It will be understood that in this case each of the disks is mounted upon a separate shaft, while in the case shown in Fig. 2 a plurality of disks could be rotatably mounted upon the same stationary shaft. It will be obvious that when the key reaches its lower limit the character to be transmitted will be completed and that the connecting-spring corresponding to the spring $h$ in Fig. 2 will be upon an insulating-block on the disk. When the key starts to ascend, it will cause the collar D' to rotate in the opposite direction; but instead of carrying the head E with it the projection E' will gradually ride up the cam-surface $D^2$, forcing the collar against the spring G until the projection reaches the shoulder $D^3$, when it will spring back to its normal position at the bottom of the cam-surface. It will be seen that this operation will not cause the rotation of the disk. By means of this construction certain disadvantages incident to that shown in Fig. 3 will be avoided, and we prefer to employ it.

Having thus described our invention, we claim as new and desire to secure by Letters Patent—

1. In a transmitting instrument, the combination with a depressible key, of a movable member having conducting and insulating spaces upon its surface, connections between the key and member for moving the latter in one direction when the key is depressed, a projection upon said member, a catch adapted to engage the surface of the member as it moves and to engage said projection to prevent the member from moving in one direction, and electrical connections between the means for moving the member and said catch.

2. The combination with a depressible key, of a rotatable disk, connections between the key and disk for rotating the latter in one direction when the key is depressed, a series of conducting and insulating spaces upon the periphery of the disk, a projection upon the disk, a spring-catch adapted to engage the periphery of the disk as it rotates and to engage said projection to prevent the disk from rotating in one direction, and electrical connections between the means for rotating the disk and said catch.

3. A transmitting instrument, comprising a depressible key, a rotatable disk, a shaft upon which said disk is fixed, a hub fixed upon said shaft and having a tooth, a collar rotatably mounted on said shaft and provided with a cam-surface for engaging said tooth, said collar being provided with a pinion, and a rack connected with said key for rotating the pinion and transmitting rotation therefrom to the shaft and to said disk.

4. A transmitting instrument, comprising a depressible key, a rotatable disk, a shaft upon which said disk is fixed, a hub fixed upon said shaft and having a tooth, a collar rotatably mounted on said shaft and provided with a cam-surface for engaging said tooth, said collar being provided with a pinion, a rack connected with said key for rotating the pinion and transmitting rotation therefrom to the shaft and to said disk, and a resilient means for normally forcing said collar toward the hub whereby its cam-surface will engage said tube.

In testimony whereof we have signed our names to this specification in the presence of two subscribing witnesses.

WILLIAM H. LEONARD.
JOSEPH H. LEWIS.

Witnesses:
   JNO. M. RITTER,
   ALBERT E. FAY.